United States Patent Office 3,630,869
Patented Dec. 28, 1971

3,630,869
PROCESS FOR ELECTRODEPOSITING
METAL-SILICATE COATINGS
Carl Y. Man, Philadelphia, Pa., assignor to E. I. du Pont
de Nemours and Company, Wilmington, Del.
No Drawing. Filed Dec. 2, 1969, Ser. No. 881,618
Int. Cl. B01k 5/02; C23b 13/00
U.S. Cl. 204—181                                    8 Claims

ABSTRACT OF THE DISCLOSURE

The electrodeposition of silicate coatings on metal articles is the subject of this invention; aqueous dispersions containing a silicate in combination with a metal, such as zinc, can be electrodeposited on metal articles to form a coating which has excellent corrosion resistance.

BACKGROUND OF THE INVENTION

This invention relates to a process for electrodepositing silicate coatings on metal articles to form a corrosion resistant coating.

It is well known in the art to apply carboxylic polymer resins to metal articles, such as auto bodies, machine parts and the like, by electrodeposition as shown in Gilchrist U.S. 3,230,162, issued Jan. 18, 1966; Gilchrist U.S. 3,362,899, issued Jan. 9, 1968; and Gilchrist U.S. 3,382,165, issued May 7, 1968. However, these carboxylic polymer coatings generally contain solvents and are combustible. Silicate coatings have been electrodeposited as shown in Canadian Pat. 488,765, issued Dec. 9, 1952, but these coatings do not have a high degree of corrosion resistance.

It would be desirable to have an inorganic coating which could be electrodeposited and which would have all of the advantages of electrodeposition and also provide excellent corrosion resistance. The novel process of this invention applies a metal-silicate coating by electrodeposition onto metal articles. The silicate coating cures at the anode to a tack-free film and has a uniform thickness and has excellent corrosion resistance.

SUMMARY OF THE INVENTION

An improved electrocoating process in which a filmforming composition is deposited on the anode of the electrocoating cell in which the anode consists of a metal article and is immersed in a bath containing the filmforming composition; a direct current is passed through the cell to deposit a coating of the film-forming composition of the anode and the coated anode is removed from the bath and dried to form a continuous film thereon; the improvement to be used with this process comprises:

A coating bath of an aqueous dispersion having a pH of about 8–12 ansd a solids content of about 20–90% by weight of:
(1) 5–50% by weight, based on the total solids of the dispersion, of a uniformly dispersed silicate selected from the group consisting of sodium silicate, lithium silicate, potassium silicate and ammonium silicate, and
(2) 95–50% by weight, based on the total solids of the dispersion, of finely divided metal particles.

DESCRIPTION OF THE INVENTION

The aqueous silicate dispersion used in the novel process of this invention, preferably has a solids content of about 60–85% and a pH of about 10–12. Useful silicates include sodium silicate, lithium silicate, potassium silicate and ammonium silicate.

A metal powder is added to the silicate coating, preferably in an amount of about 80–90% by weight, based on the weight of total solids in the dispersion. Typical metals that can be used are zinc, lead, aluminum, nickel, copper and mixtures thereof. Preferably, zinc is used to provide a coating with excellent corrosion resistance.

The coating composition utilized in the process of this invention is prepared by diluting a standard silicate dispersion with water to the desired solids content. The metal powder and pigment, if used, are blended with the silicate dispersion to form an electrocoating composition.

Under some circumstances, it may be desirable to blend pigments, dyes, or lakes with the aqueous electrocoating composition. A variety of well known standard pigments can be used, such as metal oxides, titanium dioxide, zinc oxide, metal hydroxides, chromates, lead chromates, organic dyes, iron blues, ferrous yellow, organic reds, maroons, and the like.

It is preferred that the metal article electrocoated by the novel process of this invention is sand-blasted. The metal article may be smooth or have a phosphatized surface, however, the sand-blasted article gives a preferred surface on which the coating can be applied.

In the electrocoating process, the article to be electrocoated is positioned in a conventional electrocating cell and forms the anode of the electrocoating cell. The silicate composition is placed in the cell and electric current is passed through the cell and the film-forming silicate particles and metal particles are coated onto the metal anode. Voltages of 2–30 volts can be used for 10 seconds to two minutes, but voltages of about 5–10 for about 30–60 seconds are preferred.

In any continuous electrocating process in which metal articles are continuously fed into the electrocoating bath and removed, such as occur in an automated line, it is preferred to continuously replenish the bath as the filmforming composition is being electrodeposited. One preferred replenishment concentrate has a 75 to 95 by weight solids content. This replenishment concentrate is fed into the bath at the same rate at which the solids are being removed from the bath by the electrocoating process to keep the bath at optimum solids level and pH.

The examples which follow illustrate the invention. Quantities are on a weight basis unless otherwise indicated.

EXAMPLE 1

An electrocoating composition is formulated by blending the following ingredients:

| | Parts by wt. |
|---|---|
| Aqueous lithium silicate dispersion (22% solids of lithium silicate) | 646.00 |
| Pigment blend (zinc dust/ferrite yellow/mica weight ratio 97/1/2) | 1918.00 |
| Total | 2564.00 |

The above ingredients are charged into a vessel and thoroughly mixed. The resulting electrocoating composition has a solids content of about 80% and a pH of about 10.5.

Three sand-blasted steel plates about 2 x 6 x 1/32 inches are prepared and electrocoated with the above prepared composition. The plate is positioned in the center of a galvanized steel tank having about a 700 milliliter capacity. The plate forms the anode of the electrocoating cell while the tank itself forms the cathods of the electrocoating cell. The three plates are each electrocoated under different conditions. The plates are coated under the following conditions:

| | Voltage | Time (seconds) | Film thickness, mils |
|---|---|---|---|
| Plate No.: | | | |
| 1 | 5 | 30 | 0.5-0.7 |
| 2 | 5 | 60 | 1.2-1.5 |
| 3 | 10 | 30 | 1.3-1.7 |

The plates are air-dried and in each case a smooth coating is formed of a uniform thickness which has excellent adhesion to the metal substrate. Also, each of the coatings have excellent corrosion resistance when evaluated by a standard salt spray test.

EXAMPLE 2

The electrocoating composition is formulated by blending the following ingredients:

| | Parts by wt. |
|---|---|
| Aqueous ammonium silicate dispersion (25% solids) | 683.37 |
| Pigment blend (described in Example 1) | 1707.87 |
| Total | 2391.24 |

The above ingredients are charged into a vessel and thoroughly mixed. The resulting electrocoating composition has a solids content of about 78.6% and a pH of about 11.

Three sand-blasted steel plates about 2 x 6 x 1/32 inches are prepared and electrocoated with the above prepared composition. The plate is positioned in the center of a galvanized steel tank having about a 700 milliliter capacity. The plate forms the anode of the electrocoating cell while the tank itself forms the cathode of the electrocoating cell. The three plates are each electrocoated under different conditions. The plates are coated under the following conditions:

| | Voltage | Time (seconds) |
|---|---|---|
| Plate No.: | | |
| 1 | 5 | 30 |
| 2 | 5 | 60 |
| 3 | 10 | 30 |

The plates are air-dried and in each case a smooth, uniform coating about 1-3 mils thick is formed which has excellent adhesion to the metal substrate. Also, each of the coatings have excellent corrosion resistance when evaluated by a standard salt spray test.

I claim:

1. In the process for electrocoating a film-forming polymer composition on the anode of an electrocoating cell, said anode consisting of a metal article, by immersing said anode in a bath containing a film-forming composition, passing direct current through said cell to deposit a coating on the anode, removing the coated anode from the bath and drying the coated anode to form a continuous film thereon, the improvement used therewith comprising a coating bath of an aqueous dispersion having a pH of about 8-12 and a solids content of about 20-95% by weight comprising
   (1) 5-50% by weight, based on the total solids of the dispersion, of a uniformly dispersed silicate selected from the group consisting of sodium silicate, lithium silicate, potassium silicate, and ammonium silicate, and
   (2) 95-50% by weight, based on the total solids of the dispersion of finely divided metal particles.

2. The process of claim 1 in which the finely divided metal particles are selected from the group consisting of zinc, lead, aluminum, nickel, copper and mixtures thereof.

3. The process of claim 2 in which the silicate is sodium silicate.

4. The process of claim 2 in which the silicate is lithium silicate.

5. The process of claim 2 in which the silicate is potassium silicate.

6. The process of claim 2 in which the silicate is ammonium silicate.

7. The process of claim 1 in which the silicate is lithium silicate and the metal is zinc.

8. The process of claim 1 in which the silicate is ammonium silicate and the metal is zinc.

References Cited

UNITED STATES PATENTS 2,650,975  9/1953  Dorst _____ 204—181

HOWARD S. WILLIAMS, Primary Examiner